United States Patent
Colic et al.

(10) Patent No.: US 7,125,005 B2
(45) Date of Patent: Oct. 24, 2006

(54) CONTACT TRAY HAVING TRAY SUPPORTED DOWNCOMERS

(75) Inventors: Veada P. Colic, Dallas, TX (US); Gary W. Gage, Grand Prairie, TX (US); Alessandro Attura, Dallas, TX (US)

(73) Assignee: Koch-Glitsch, LP, Wichita, KS (US)

( * ) Notice: Subject to any disclaimer, the term of this patent is extended or adjusted under 35 U.S.C. 154(b) by 0 days.

(21) Appl. No.: 11/142,957

(22) Filed: Jun. 2, 2005

(65) Prior Publication Data
US 2005/0218534 A1    Oct. 6, 2005

Related U.S. Application Data

(60) Continuation of application No. 10/844,177, filed on May 12, 2004, now abandoned, which is a division of application No. 10/172,914, filed on Jun. 17, 2002, now Pat. No. 6,736,378.

(60) Provisional application No. 60/298,962, filed on Jun. 18, 2001.

(51) Int. Cl.
B01F 3/04 (2006.01)
(52) U.S. Cl. .................. 261/114.1; 261/114.5
(58) Field of Classification Search .. 261/114.1–114.5; 202/158
See application file for complete search history.

(56) References Cited

U.S. PATENT DOCUMENTS

| | | | |
|---|---|---|---|
| 2,380,852 A | 7/1945 | Lambert et al. | |
| 2,420,075 A | 5/1947 | Glitsch | |
| 2,544,614 A | 3/1951 | Rapisarda | |
| 2,804,935 A * | 9/1957 | Hutchinson | 96/120 |
| 3,573,172 A * | 3/1971 | Streuber | 202/158 |
| 3,759,497 A * | 9/1973 | Black | 261/113 |
| 4,060,399 A * | 11/1977 | Gleason | 96/329 |
| 5,047,179 A * | 9/1991 | Nye | 261/114.1 |
| 5,223,183 A * | 6/1993 | Monkelbaan et al. | 261/114.1 |
| 5,244,604 A * | 9/1993 | Miller et al. | 261/97 |
| 5,318,732 A * | 6/1994 | Monkelbaan et al. | 261/114.1 |
| 5,702,647 A * | 12/1997 | Lee et al. | 261/114.5 |
| 6,003,847 A * | 12/1999 | Lee et al. | 261/114.1 |
| 6,059,272 A * | 5/2000 | Potthoff et al. | 261/97 |
| 6,095,504 A | 8/2000 | Heldwein et al. | |
| 6,131,891 A | 10/2000 | Resetarits et al. | |
| 6,575,438 B1 * | 6/2003 | Nutter et al. | 261/114.1 |
| 6,736,378 B1 * | 5/2004 | Colic et al. | 261/114.1 |

* cited by examiner

Primary Examiner—Scott Bushey
(74) Attorney, Agent, or Firm—Hovey Williams LLP

(57) ABSTRACT

A plurality of fluid-fluid contact trays of the cross-flow type are provided for mounting within a shell of a mass transfer or heat exchange column. The trays include tray decks that may be supported on rings fixed to an inner surface of the shell and downcomers that are supported, not by the typical bolting bars fixed to the shell, but by the tray deck of the underlying tray. The mechanisms for supporting the downcomers in this fashion are support brackets that are not secured to the column shell, but instead extend downwardly from the downcomers and rest on the tray deck of the underlying tray. Alternating trays have side downcomers positioned at openings at one or both ends of the tray deck. The support rings for those trays having side downcomers may be truncated so that the rings do not extend around that portion of the shell circumference where the side downcomer openings are located. On the remaining trays, complete 360 degree rings may be used. Some or all of the downcomers have an inwardly extending shoulder segment in one or both side walls that supports portions of the tray deck and contains fluid passages.

14 Claims, 5 Drawing Sheets

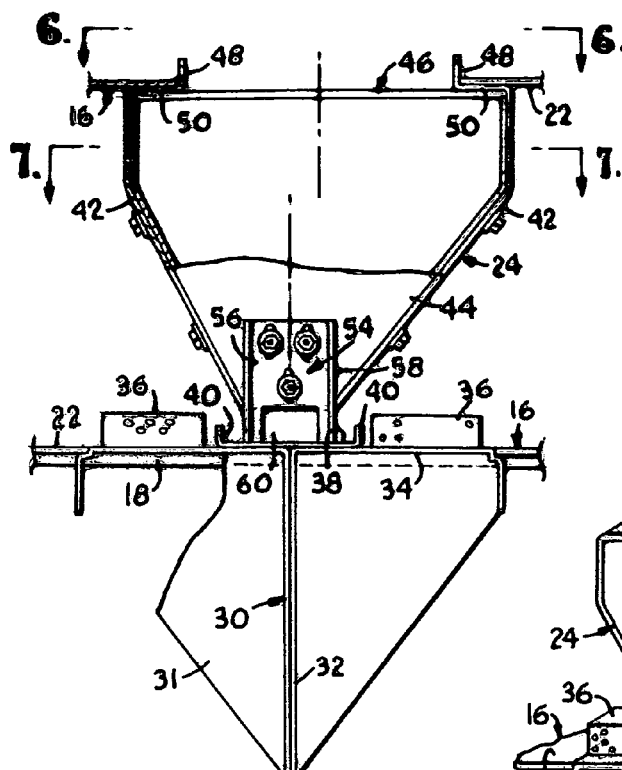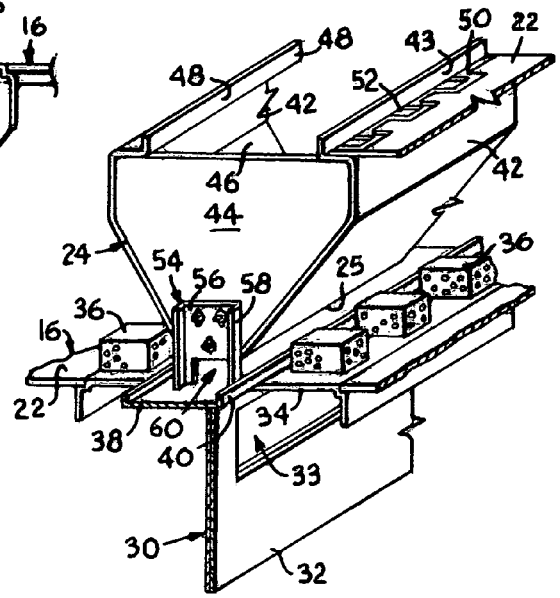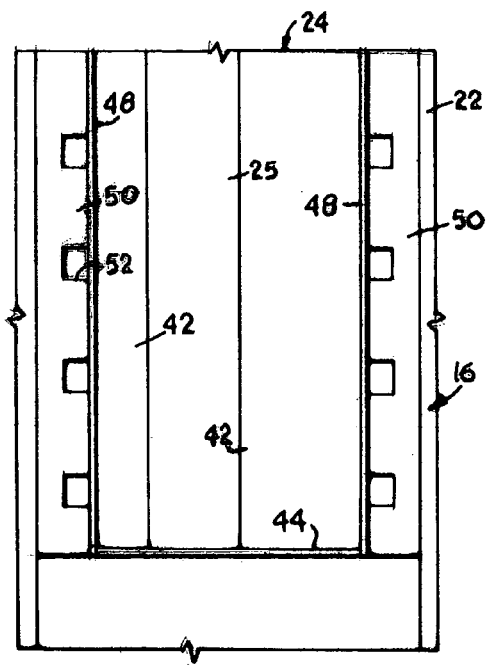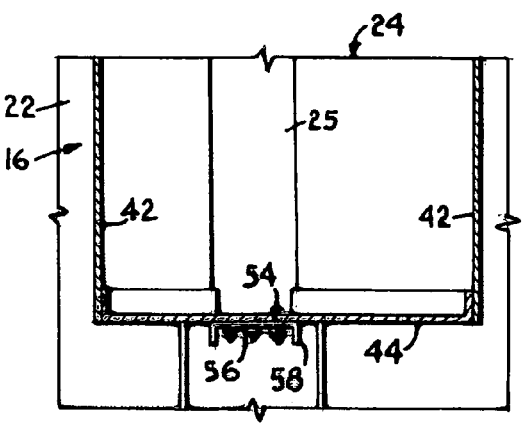

CONTACT TRAY HAVING TRAY SUPPORTED DOWNCOMERS

CROSS REFERENCES TO RELATED APPLICATION

This is a continuation application of U.S. utility application Ser. No. 10/844,177, filed on May 12, 2004 now abandoned, which in turn is a divisional application of U.S. utility application Ser. No. 10/172,914, filed on Jun. 17, 2002, (now U.S. Pat. No. 6,736,378), which claims the benefit of provisional application Ser. No. 60/298,962, filed Jun. 18, 2001. The entireties of the disclosures of said prior utility applications are hereby incorporated herein by this specific reference thereto.

BACKGROUND OF THE INVENTION

The present invention is directed to mass transfer devices and, more particularly, to vapor-liquid contact trays and methods of making and utilizing such trays.

Various types of trays are commonly used in mass transfer columns to promote contact and mass transfer between ascending and downwardly flowing fluid streams. The ascending fluid is typically vapor and the descending fluid is typically liquid, although liquid-liquid and gas-liquid systems are also known. Each tray normally extends horizontally across substantially the entire horizontal cross section of the column and is supported around its perimeter by a ring welded to the inner surface of the circular column wall or shell. A number of trays are positioned in this manner with a uniform vertical spacing between adjacent trays. The trays may be located in only a portion of the column to perform one part of a multi-step process occurring with the column. Alternatively, the trays may fill substantially the entire open area within the column.

Trays of the type described above contain one or more downcomers that are positioned at openings in the tray deck to provide passageways for liquid to descend from one tray to an adjacent lower tray. Prior to entering the downcomer, the liquid on the tray deck interacts with ascending vapor that passes through openings provided in selected portions of the tray deck. Those areas of the tray deck containing vapor openings are commonly referred to as "active" areas because of the vapor and liquid mixing and frothing that occurs above those areas of the tray. The downcomer inlets on vertically adjacent trays may extend in laterally opposite directions to promote more uniform lateral distribution of the descending liquid or they may extend in a parallel but offset relationship.

At least two broad categories of trays are used in mass transfer columns. The first category of trays is referred to as counter-flow trays or multiple downcomer trays and is characterized by a relatively large number of downcomers positioned on each tray. In counter-flow trays, the downcomers are generally trough-shaped and extend above the tray so that liquid must accumulate on the tray surface before entering the inlet to the downcomer. The lower outlet of such downcomers utilizes a perforated plate that causes liquid to accumulate within the downcomer to seal the outlet against the entry of ascending vapor into the downcomer where it would impede the descending flow of liquid. The lower outlet of this type of downcomer is normally located well above the deck of the tray below and above the inlet of the downcomers on the tray below.

The second broad category of trays is referred to as cross-flow trays and differs from counter-flow trays in several significant respects. First, the number of downcomers utilized in cross-flow trays is normally less than the number used in counter-flow trays. Cross-flow trays normally use a side downcomer located at opposite ends of adjacent trays, although in multiple pass configurations one or more additional downcomers are located at intermediate locations on each cross-flow tray. Downcomers on cross-flow trays normally discharge liquid onto an imperforate receiving pan located on the tray below and inlet weirs are provided adjacent the receiving pan to cause liquid to accumulate above the level of the downcomer outlet to seal against entry of vapor into the downcomer. By contrast, as discussed above, counter-flow tray downcomers use a perforated discharge plate rather than an inlet weir to form the liquid seal and liquid is discharged onto the active area of the underlying tray rather than onto an imperforate seal pan.

Counter-flow and cross-flow trays also differ in the manner in which they are constructed and installed in a column. Counter-flow trays are normally supported entirely on the support rings that are welded to the inner surface of the column shell. Because the downcomer outlets in counter-flow trays are located well above the tray below, some variations in tray spacing resulting from deviations in ring placement and downcomer construction can be accommodated without significantly affecting tray performance. As a result, each downcomer and tray panel in a counter-flow tray is normally preassembled and then simply carried into the column through a manway or other opening and positioned on the support ring.

By contrast, the downcomers in cross-flow trays extend almost completely to the tray below and must be carefully positioned to ensure that the proper vertical clearance is provided between the lower edge of the downcomer and the imperforate seal pan on the tray below. Variations in this vertical clearance can significantly affect the amount of liquid that can be discharged from the downcomer and may result in detrimental flooding of the downcomer and column. Because the vertical clearance is so important, the downcomer is normally assembled within the column using multiple pieces so that the lower wall or apron of the downcomer can be adjusted to provide the proper vertical clearance.

The downcomers in counter-flow and cross-flow trays also differ in the manner in which they are supported in the column. Counter-flow downcomers are box-like in configuration and normally do not extend completely across the column cross section in order to simplify installation of the trays. Because fewer downcomers are normally used in cross-flow trays, they traditionally extend completely across the horizontal cross section of the column to maximize the total liquid carrying capacity of the downcomers. Normally the column shell forms the short end walls of these downcomers and, in the case of side downcomers, one of the longitudinally extending downcomer side walls. The remaining side walls of each downcomer are attached to the column shell using numerous vertically extending and inclined bolting bars that are prepositioned and welded to the inner surface of the column shell. Location and installation of these bolting bars is a time-consuming and labor-intensive task that can add significantly to the installation cost of cross-flow trays. Moreover, if the bolting bars are misaligned, installation of the downcomer is made more difficult and/or the important vertical discharge clearance at the downcomer outlet may be adversely affected.

A need has thus developed for a cross-flow tray that is easier to install and does not require the use of downcomer bolting bars.

BRIEF SUMMARY OF THE INVENTION

In one aspect, the present invention is directed to a mass transfer or heat exchange column having an upright shell that defines an open internal region and has an inner surface with a circumference of preselected length. A first tray support in the nature of a partial or complete support ring is attached to the inner surface of the shell and extends in a first plane around at least a portion of the circumference of the inner surface of the shell. A second tray support also in the nature of a support ring or segments thereof is attached to the inner surface of the shell and extends in a second plane spaced a preselected distance below the first plane around at least a portion of the circumference of the inner surface of the shell. A first tray and an underlying second tray are positioned within the shell and each tray is of similar construction and comprises a tray deck having an active area and opposed ends and opposed sides. At least one and normally a plurality of downcomers are each positioned at an opening in the tray deck and extend in a downward direction for removing liquid following interaction with vapor on the tray deck. The tray deck of the first tray is supported by said first tray support and the tray deck of the second tray is supported by the second tray support. At least one support bracket extends downwardly from one or more of the downcomers of the first tray to the underlying second tray and supports the associated downcomers of the first tray on the underlying second tray. In this manner, the support brackets allow the desired downcomer clearance to be maintained even though there may be variances in the placement of the support rings. Moreover, the elimination of bolting bars that are conventionally welded to the column shell allows for quicker and less costly assembly of the trays 16 within the column 10.

In another aspect, the invention is directed to a method of installing a plurality of the contact trays within a new or revamped mass transfer or heat exchange column. The method includes the steps of providing a first tray support attached to the inner surface of the shell and extending in a first plane around some or substantially the entire circumference of the inner surface of the shell. A second tray support is attached to the inner surface of the shell and extends in a second plane spaced a preselected distance below the first plane around some or substantially the entire circumference of the inner surface of the shell. A first tray and an underlying second tray of the type described herein are carried into the column through suitable manways or other openings and are assembled with the tray deck of the first tray supported on the first tray support and the tray deck of the second tray supported on the second tray support. The downcomers of at least the first tray and preferably both the first and second trays are supported entirely on the tray deck of the underlying trays.

The present invention is also directed to a contact tray comprising a tray deck having vapor apertures for permitting vapor to ascend through the tray for mixing with liquid flowing across the tray deck, an elongated opening in the tray, and a downcomer positioned at the opening for removing liquid from the tray deck. The downcomer comprises spaced apart side walls and end walls that extend between the side walls to close opposite ends of the downcomer. Each of the side walls comprises a lower segment, an upright intermediate segment and an inwardly extending shoulder segment. At least one of the lower segments is inclined toward the other lower segment to from a lower discharge outlet having a preselected open area in a horizontal plane which is less than a horizontal cross-sectional area between the intermediate segments of the downcomer. Portions of the tray deck overlap and are supported on the shoulder segments. Aligned fluid passage openings in the shoulder segments and the overlapped portions of the tray deck allow liquid entry into the downcomer during start up. Following start up, the fluid passage openings also permit vapor that has separated from liquid in the downcomer to exit the downcomer without impeding liquid entry into the downcomer inlet. Advantageously, each downcomer side wall and an associated weir are of a one-piece construction formed by folding a single sheet of metal.

BRIEF DESCRIPTION OF THE SEVERAL VIEWS OF THE DRAWINGS

In the accompanying drawings which form part of the specification and in which like reference numerals are used to indicate like parts in the various views:

FIG. 4 is an enlarged, fragmentary elevation view of a portion of the tray containing a downcomer, with an end wall of the downcomer being broken away for illustration purposes;

FIG. 5 is a fragmentary end perspective view of the downcomer shown in FIG. 4;

FIG. 6 is a top plan view of the downcomer taken along line 6—6 of FIG. 4 in the direction of the arrows;

FIG. 7 is top plan view of the downcomer taken in horizontal section along line 7—7 of FIG. 4 in the direction of the arrows;

DETAILED DESCRIPTION OF THE INVENTION

Figure 1:
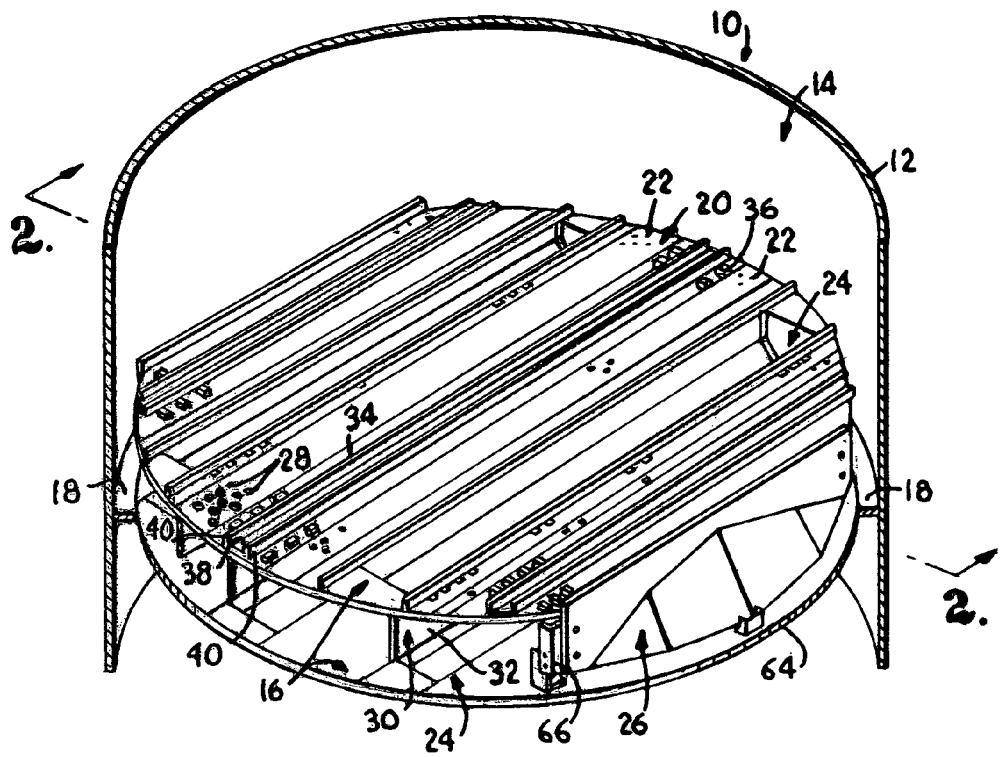
FIG. 1 is a fragmentary perspective view of a mass transfer column containing cross-flow trays constructed in accordance with one embodiment of the present invention.
Figure 2:
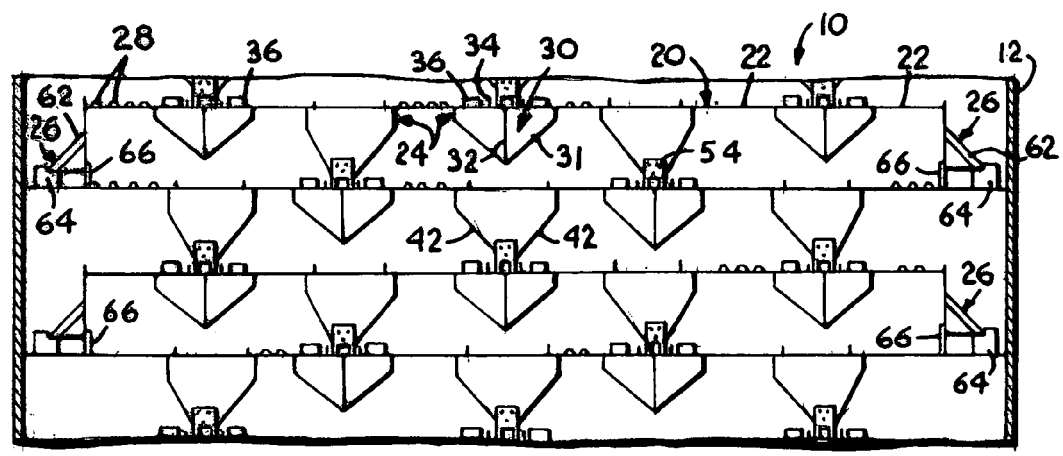
FIG. 2 is an enlarged, fragmentary elevation view of the column and a plurality of trays taken in vertical section along line 2—2 of FIG. 1.
Figure 3:
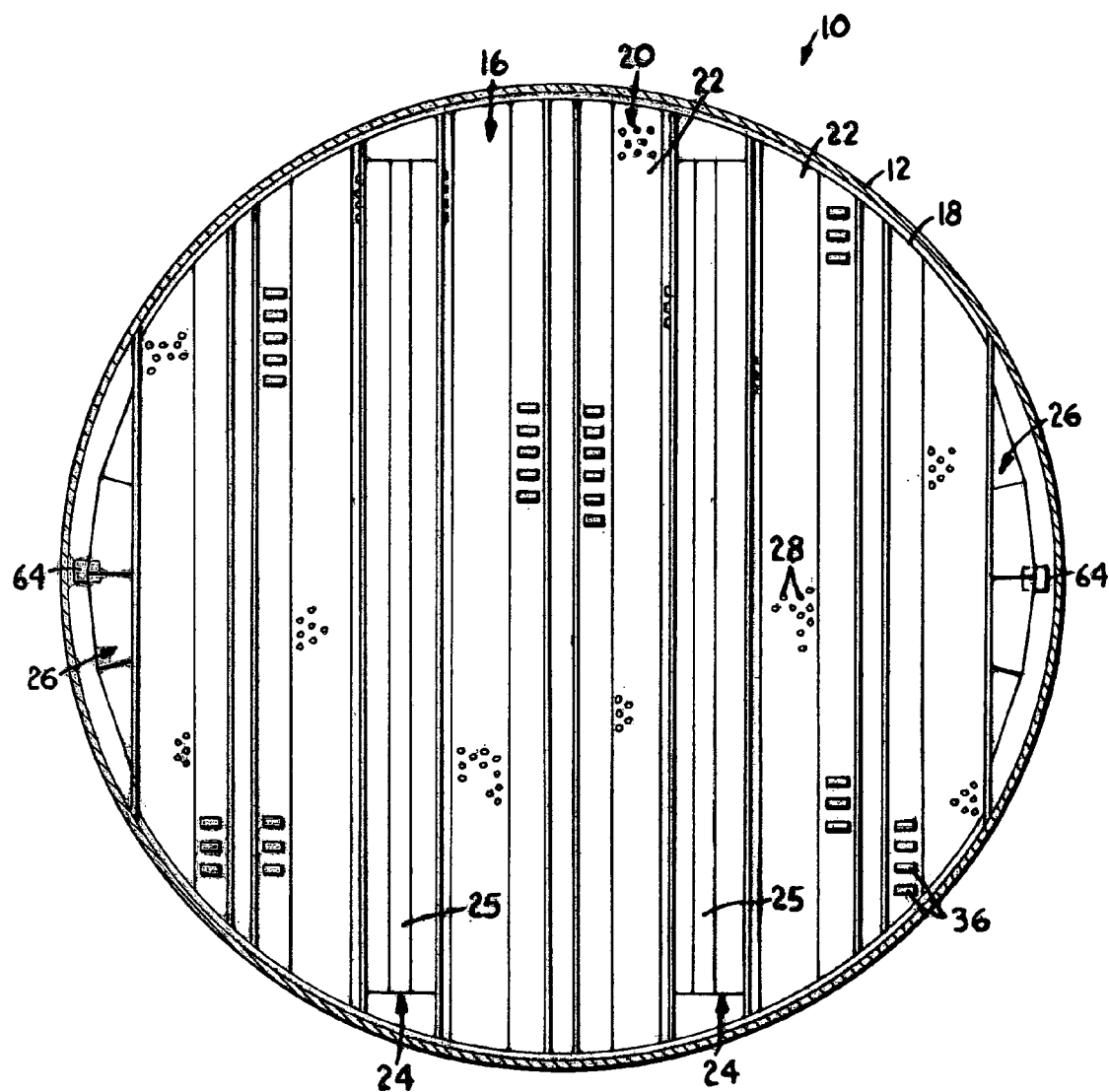
FIG. 3 is a top plan view of the column and tray.

Referring now to the drawings in greater detail, and initially to FIGS. 1–3, a mass transfer or heat exchange column is designated generally by the numeral 10 and includes an upright cylindrical shell 12 which defines an open interior region 14 in which a plurality of fluid-fluid contact trays 16 are located. The trays 16 are of a cross-flow design and are normally used for facilitating vapor-liquid fractionation or other contact, but may also be used in liquid-liquid and gas-liquid applications. Column 10 is of a type used for processing liquid and vapor streams, including to obtain fractionation products. Although column 10 is shown in a cylindrical configuration, other shapes, including polygonal, may be used. The column 10 can be of any suitable diameter and height and can be constructed from suitable rigid materials.

One or more liquid streams can be directed to the column 10 in a conventional manner through feed lines that are not shown because of their conventional nature. Likewise, one or more vapor streams can be charged to the column or can be generated within the column. In addition to trays 16, internals such as beds of packing can be located within the column to carry out other desired processing of the liquid and vapor streams. Other appropriate system components such as connections and lines for feed, product removal and reflux streams, reboilers, condensers, and the like are not illustrated because of their conventional nature.

The trays 16 of the present invention are positioned in the interior region 14 of column 10 and are located in vertically spaced apart relationship. The trays 16 are generally horizontally disposed and are supported on rings 18 that are welded or otherwise mounted on the inner surface of the column shell 12. As more fully described below, some rings 18 extend completely around the inner circumference of the column 10, while others are formed as two or more spaced apart ring segments that circumscribe only selected portions of the inner circumference of the column.

Each tray 16 comprises a tray deck 20 formed from a plurality of generally coplanar panels 22 that are spaced apart to form a plurality of elongated openings. Downcomers 24 are positioned in these openings to remove liquid from the tray deck 20 and convey it to the next underlying tray 16 through a lower discharge outlet 25. The two panels 22 at the opposite ends of alternate trays 16 are similarly spaced from column shell 12 to form a chordal opening in which side downcomers 26 are positioned. The downcomers 24 are oriented so that their longer horizontal dimensions extend in the same direction, but downcomers 24 on adjacent trays 16 are staggered so that they are not in vertical alignment.

Figure 8:
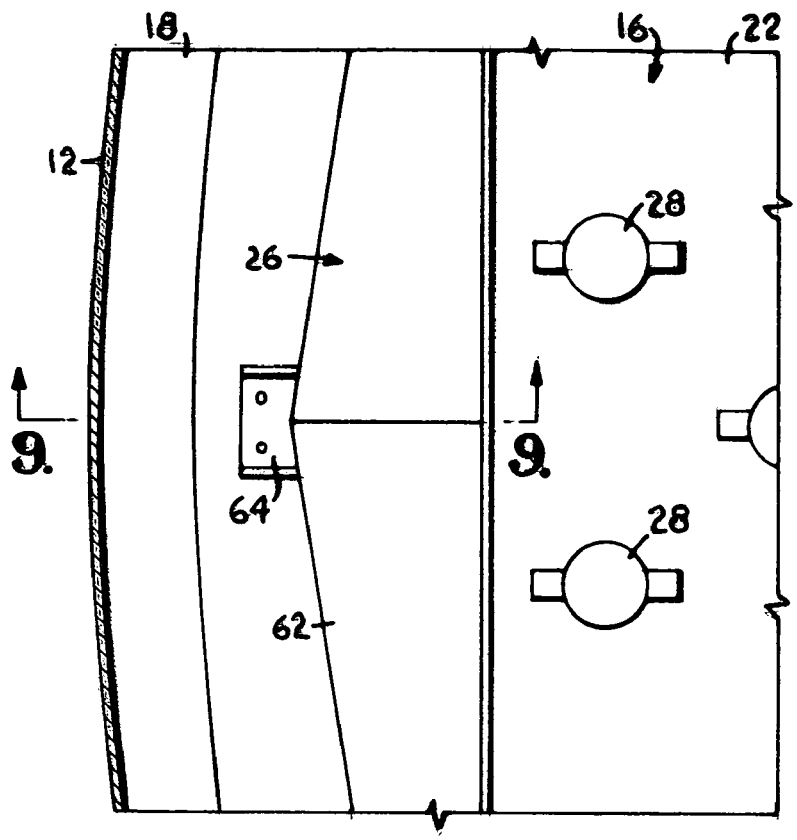
FIG. 8 is a fragmentary top plan view of the column showing a portion of a side downcomer supported on an underlying tray.

The panels 22 of the tray deck 20 include a plurality of vapor flow apertures 28 uniformly distributed across the portion of the tray deck known as the "active area." The apertures 28 permit vapor to pass through the tray deck and interact with liquid flowing across the upper surface of the deck. The apertures 28 have a size, shape and distribution selected for the particular operating conditions in which the tray 16 will be utilized. As best shown in FIG. 8, the apertures 28 can be punched valves of a conventional design. Alternatively, the apertures 28 can be moveable valve units or simple sieve holes.

Each tray deck panel 22 is supported at its opposite ends by the support ring 18 welded to the column shell 12. In those portions of the tray deck 20 where no panels 22 are located, portions of the support ring 18 can be omitted to simplify the installation process. For example, the support ring 18 need not be present at those portions of the trays 16 where the side downcomers 26 are located. As can best be seen in FIGS. 4 and 5, the sides of deck panels 22 partially overlap and are supported by T-shaped beams 30 that extend in the same longitudinal direction as the deck panels 22. The T-shaped beams 30 are likewise supported at their opposite ends by the support ring 18. Each beam 30 is preferably formed from two pieces of flat metal stock that are bent into an inverted L-shape and are then joined together to form the T-shape of the beam. Other fabrication techniques, of course, are available and optional gussets 31 may be used for strengthening purposes. The vertical leg of the beam 30 functions as an anti-jump baffle 32 to help to direct liquid into the vertically aligned downcomer 24 on the tray below. A plurality of openings 33 may be formed in the baffle 32 to permit vapor to flow through the baffle 32 to equalize the pressure on both sides thereof.

The laterally or horizontally extending portions of T-shaped beams 30 form an inlet panel 34 that underlies the downcomers 24 extending downward from the tray 16 above. Two parallel and spaced apart rows of box-shaped bubble promoters 36 are positioned on the upper surface of the inlet panel 34 above openings (not shown) formed in the inlet panel 34 to permit vapor entry into the bubble promoters 36.

An elongated liquid receiving pan 38 is centrally positioned between the rows of bubble promoters 36 on top of the inlet panel 34 and extends along the length of the inlet panel 34. The receiving pan 38 is in vertical alignment with the discharge outlet 25 of the overlying downcomer 24 so that it receives the liquid discharged from the overlying downcomer 24. The receiving pan 38 is preferably imperforate to prevent the downward flowing liquid from weeping through the receiving pan 38 and thereby bypass the intended interaction with vapor on the tray deck.

Positioned along both sides of the receiving pan 38 are weirs 40 that extend upwardly a preselected distance to cause liquid discharged from the overlying downcomer 24 to accumulate on the receiving pan 38 to form a liquid seal that impedes entry of vapor into the discharge outlet 25 of the overlying downcomer 24. The receiving pan 38 and weirs 40 are preferably of a single-piece construction formed by bending upwardly the longitudinal sides of a piece of elongate flat metal stock.

Each downcomer 24 comprises a pair of longitudinally extending and spaced apart side walls 42 and a pair of end walls 44 that are secured to ends of the side walls 42. The spacing between the vertically extending upper portions of the side walls 42 forms an inlet 46 for liquid to enter the downcomer 24. The lower or apron portions of the side walls 42 are angled toward each other to form the discharge outlet 25 which has a smaller cross-sectional area than the inlet 46 so that some liquid will accumulate within the downcomer during operation of the column 10. A pair of spaced apart weirs 48 is formed along the downcomer inlet 46 so that liquid will accumulate on the tray deck 20 for vapor interaction prior to entering downcomer 24. Each downcomer side wall 42 and associated weir 48 are of a one-piece construction formed by bending flat metal stock. In this manner, the weir 48 is formed integrally with the side wall 42 and is connected to a horizontal flange 50 that extends inwardly from the upper portion of the side wall 42. As can best be seen in FIGS. 5 and 6, the flange 50 and overlapped portions of the tray deck 20 advantageously include a plurality of spaced apart and aligned openings 52 that function as start up spouts to permit liquid entry into the downcomer 24 at the low flow rates present during start up of the column 10. It can be seen that the horizontally extending flange 50 also supports the overlapped portions of the tray deck 20 and allows the upper portion of the side walls 42 to be displaced outwardly to increase the internal volume of the downcomer 24. After start up, the openings 52 contained in the flange 50 and tray deck 20 providing a ready flow path for vapor to exit the internal volume of the downcomer 24 after disengaging from the liquid therein.

Each downcomer 24 includes a support bracket 54 secured to the lower portion of each downcomer end wall 44. The support bracket 54 extends downwardly below the end wall 44 a preselected distance corresponding to the desired vertical discharge clearance at the downcomer outlet 25. When the downcomer 24 is positioned in the column 10, the support brackets 54 rest on the receiving pan 38 of the underlying tray 16. In this manner, the support brackets 54 carry the entire weight of the downcomer 24 and transfer it to the T-shaped beam 30 on the tray 16 below. The downcomers 24 thus do not need to be supported on the same ring 18 as the tray 16 from which the downcomer descends. Because the support brackets 54 transfer the weight of the downcomer 24 to the tray below, the downcomers 24 do not need to be supported by vertical bolting bars as is the case with conventional cross-flow trays. Moreover, because the support brackets 54 maintain the desired vertical clearance between the downcomer discharge outlet 25 and the underlying receiving pan 38, the downcomer 24 need not be of a multiple piece construction as is conventionally necessary to permit adjustment of the downcomer apron to obtain the desired vertical discharge clearance. As a result, the downcomer side walls 42 can be of a one-piece construction and the downcomer can be preassembled outside of the column 10 and then simply carried through a manway and positioned on the underlying tray 16. By eliminating the need to install bolting bars and assemble the downcomer from multiple pieces within the column, substantial time and expense can be saved in the installation of downcomers 24.

Each support bracket 54 comprises a generally planar body 56 and a pair of vertically extending stiffening flanges 58. An opening 60 is preferably formed in the body 56 to permit fluid to flow through the bracket 54. The bracket 54 can be welded, bolted or otherwise secured to the outer face of the downcomer end wall 44.

Figure 9:
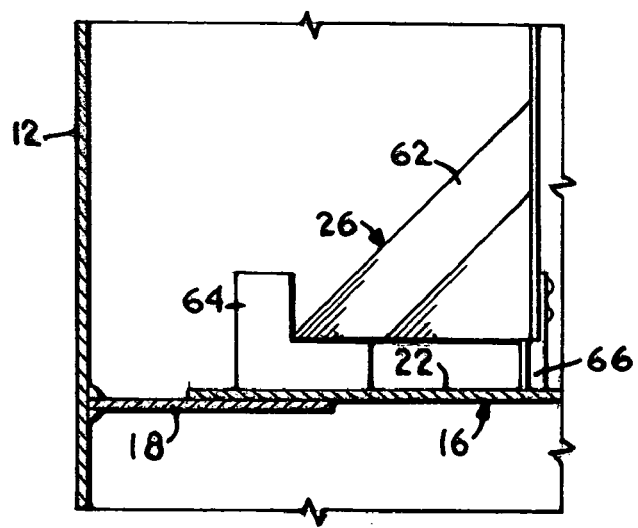
FIG. 9 is a fragmentary side elevation view of the column taken in vertical section along line 9—9 of FIG. 8 and showing the manner in which the side downcomer is support on the underlying tray.
Figure 10:
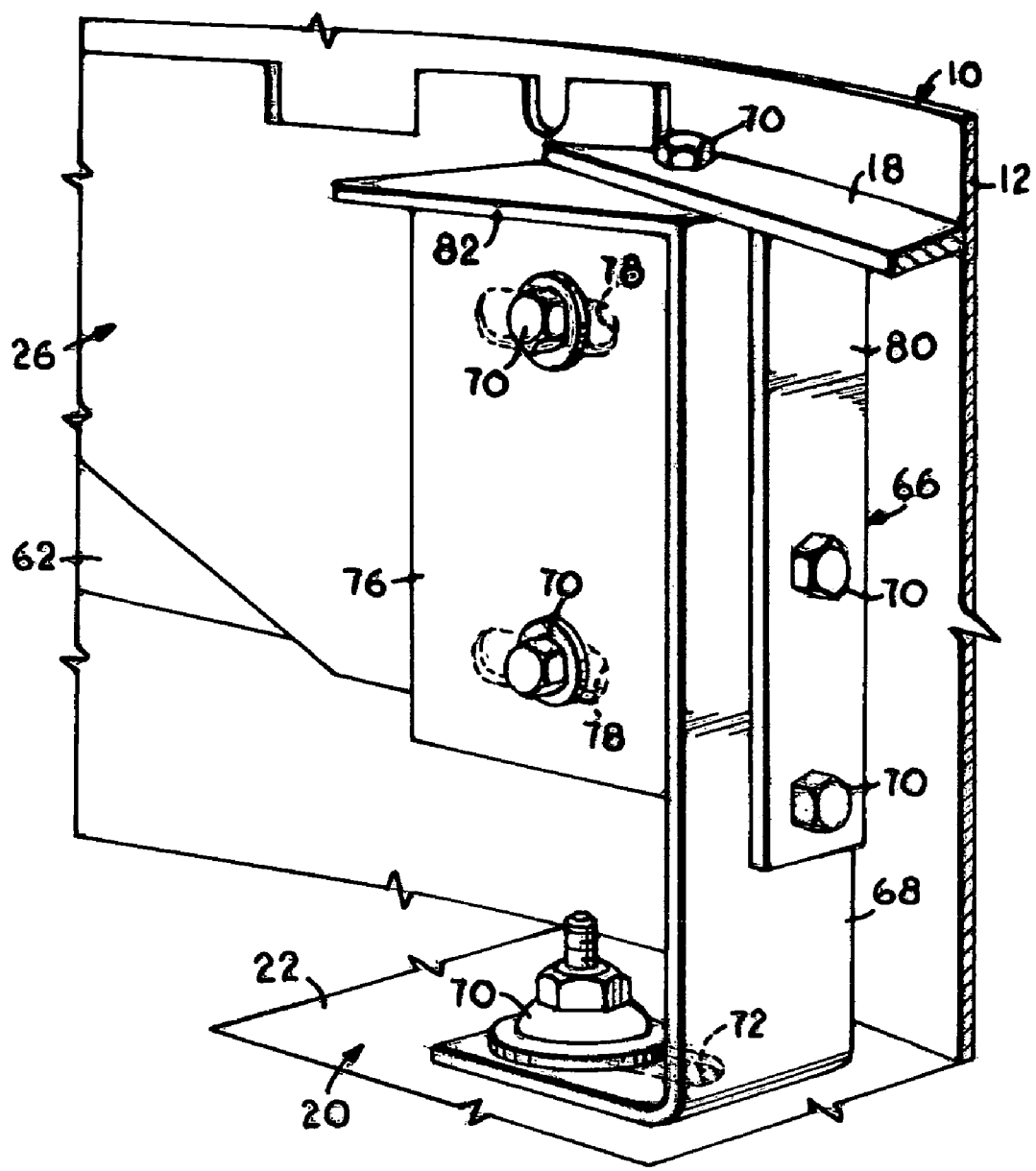
FIG. 10 is an enlarged fragmentary perspective view showing one of the brackets used to support one end of the side downcomer.

Turning additionally to FIGS. 8 and 9, each side downcomer 26 can be supported on the underlying tray 16 in a manner similar to intermediate downcomers 24. The side downcomers 26 are chordal in configuration and include a multi-segmented, semi-conical lower skirt 62. A support bracket 64 is secured to the underlying tray panel 22 at a location to receive and support the downcomer skirt 62. The bracket 64 is generally U-shaped and is cut out to form an L-shape in side profile. In this manner, the bracket 64 functions to provide the desired vertical clearance between the lower discharge end of the downcomer skirt 62 and the underlying tray panel 22 and also positions the downcomer skirt 62 the desired horizontal distance from the column shell 12. As can best be seen in FIGS. 9 and 10, a pair of support brackets 66 are also secured to opposite ends of the downcomer 26 to provide additional support for the downcomer 26 on the underlying tray deck 20. The support brackets 66 are each of a two-piece construction with a lower L-shaped leg 68 that is moveably secured to the underlying tray deck 20. Various methods of securing the leg 68 to the trays deck 20 can be utilized, including a fastener 70, such as a nut and bolt, that extends through a closed-ended slot 72 in the tray deck 20 and an opening (not shown) in the leg 68. The slot 72 allows adjustment of the positioning of the leg 68 in relation to the shell 12, with the leg 68 preferably being adjusted so that it abuts the shell 12 and provides a partial seal thereagainst. Each support bracket 66 also includes an upper segment 74 that has a vertical plate 76 that is secured to the downcomer skirt 62 by fasteners 70 that extend through adjustment slots 78 in the downcomer skirt 62. The upper segment 74 includes a flange 80 that extends at 90 degrees from a vertical edge of the plate 76 and is secured to the lower leg 68 by a pair of the fasteners 70. A horizontally extending flange 82 extends along the upper edge of the plate 76 and is secured to the support ring 18 for the overlying tray deck 20. It can be seen that the method described herein for supporting the downcomers 24 and side downcomers 26 entirely on the underlying tray deck 20 allows the trays 16 to be readily assembled within the column 12 without the delays and expense associated with bolting bars that are conventionally welded to the inner surface of the column shell 12 to provide support for the downcomers. Further installation savings are obtained by using support ring segments only in those portions of the shell 12 circumference where the tray deck 12 requires support. The openings in the tray deck 20 where the downcomers are located, particularly the side downcomers 26, do not require the presence of the support rings 18. Omitting the support rings 18 from these areas can also increase the capacity of the downcomers by increasing the open area for liquid entry into the downcomer inlet 46. In other applications, such as existing columns, the use of complete support rings 18 may be desirable or even preferred.

The present invention includes a method of constructing the column 10, comprising the steps of providing a first support ring 18 attached to the inner surface of the shell 12 and extending in a first plane around the circumference of the inner surface of the shell 12. A second support ring 18 is attached to said inner surface of the shell 12 and extends in a second plane spaced a preselected distance below the first plane around the circumference of the inner surface of the shell 12. The tray decks 20 of a first tray 16 and an underlying second tray 16 are supported on the first and second support rings 18, respectively, while the downcomers 24 and/or 26 of the first tray 16 are supported entirely on the tray deck 20 of the underlying second tray 16.

From the foregoing it will be seen that this invention is one well adapted to attain all ends and objectives hereinabove set forth together with the other advantages which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

We claim:

1. A contact tray arrangement for an elongated, upright mass transfer or heat exchange column having an internal tray receiving space, said tray arrangement comprising:

first and second vapor liquid contact trays, each having an upper surface, said trays being mountable in the internal space of a said column with the first tray disposed above the second tray in vertically spaced relationship thereto and with said upper surfaces extending laterally across the internal space, said first tray having an opening therein and said second tray including a support segment disposed to extend laterally of the internal space beneath said opening, said support segment including an upper portion with an upper surface area that is a part of the upper surface of the second tray and a lower portion comprising a downwardly extending panel; and a downcomer located at said opening and extending downwardly from the first tray toward said support segment, said downcomer including a support bracket having a lower end sector arranged to contact said upper surface area of the support segment and provide vertical support for the downcomer.

2. A contact tray arrangement as set forth in claim 1, wherein said support segment is elongated and T-shaped in transverse cross-sectional configuration.

3. A contact tray arrangement as set forth in claim 1, wherein is included a laterally extending gusset positioned adjacent said downwardly extending panel to strengthen the support segment.

4. A contact tray arrangement as set forth in claim 2, wherein is included a laterally extending gusset positioned adjacent said downwardly extending panel to strengthen the support segment.

5. A contact tray arrangement as set forth in claim 1, including a third vapor liquid contact tray having an upper surface that is mountable in the internal space of the column with its upper surface extending laterally across the internal space, said third tray being disposed beneath the second tray in vertically spaced relationship thereto, said third tray having a downcomer accommodating opening therein, said downwardly extending panel being located above said opening of the third tray in a position to provide liquid anti-jump baffling for said opening of the third tray when the trays are installed in a said column.

6. A contact tray arrangement as set forth in claim 1, wherein a vapor flow accommodating opening is provided in said downwardly extending panel.

7. A contact tray arrangement as set forth in claim 5, wherein a vapor flow accommodating opening is provided in said downwardly extending panel.

8. A contact tray arrangement as set forth in claim 1, wherein a liquid flow accommodating opening is provided in said lower end sector of the support bracket.

9. A contact tray arrangement for an elongated, upright mass transfer or heat exchange column having an internal tray receiving space, said tray arrangement comprising:
   a vapor liquid contact tray having an upper surface, said tray being mountable in the internal space of a said column with said upper surface extending laterally across the internal space, said tray having an elongated opening therein and including a pair of spaced apart portions located on opposite sides of said opening; and
   an elongated downcomer located at said opening and extending downwardly from said contact tray when the tray is mounted in a said column, said downcomer comprising a pair of downwardly extending, laterally spaced side walls, each said side wall having an inwardly extending shoulder element at an upper end portion thereof,
   said tray portions each having an elongated edge section disposed in overlapping relationship relative to a respective shoulder element, whereby said shoulder elements provide support for the tray portions,
   at least one of said shoulder elements and its overlapping edge section having respective aligned fluid passage openings therein.

10. A contact tray arrangement as set forth in claim 9, wherein each said side wall has an upper segment and a lower segment, said inwardly extending shoulder element being disposed at an upper end portion of said upper segment, said lower segments being positioned relative to one another so as to present an elongated discharge outlet having an open area less than the open area of said elongated opening.

11. A contact tray arrangement as set forth in claim 9, wherein is included weirs extending upwardly at inner edges of said shoulder elements.

12. A contact tray arrangement as set forth in claim 10, wherein is included weirs extending upwardly at inner edges of said shoulder elements.

13. A contact tray arrangement as set forth in claim 11, wherein at least one of the side walls is formed from a single bent sheet of metal.

14. A contact tray arrangement as set forth in claim 12, wherein at least one of the side walls is formed from a single bent sheet of metal.

\* \* \* \* \*